3,794,517
ELECTRIC CIRCUIT ELEMENTS AND METHODS OF MANUFACTURING SUCH ELEMENTS

Jean Michel Baudry Ghislain Yperman, Sint-Stevens-Woluwe, and Charles Belhomme, Evere, Belgium, assignors to U.S. Philips Corporation, New York, N.Y.

No Drawing. Continuation of abandoned application Ser. No. 601,342, Dec. 13, 1966. This application Dec. 28, 1971, Ser. No. 213,176
Claims priority, application Netherlands, Dec. 15, 1965, 6516296
Int. Cl. H01l 1/14
U.S. Cl. 117—217 3 Claims

ABSTRACT OF THE DISCLOSURE

A method is shown for increasing the stability of the electrical resistance of n-type semiconductor bodies provided with ohmic contact electrodes. The method comprises first vacuum depositing chromium on the semiconductor body and then vacuum depositing a solderable metal on the chromium layer. This abstract is in no way intended to be a description of the invention defined by the claims.

This application is a continuation of the previously filed application Ser. No. 601,342 filed Dec. 13, 1966, now abandoned.

The invention relates to an electric circuit element having an n-type semiconductor oxidic ceramic body provided with at least one ohmic contact electrode and a method of manufacturing such an element.

Similar electric circuit elements having ohmic contact electrods are known per se. As materials for these electrodes various metals or alloys have been used, for example, indium amalgam or titanium coated with a layer of silver.

Applicants have found that the electric resistance of said known circuit elements does not remain constant when they are exposed for a prolonged period of time to moist air at elevated temperatures and under prolonged, varying voltages. This is probably due to the occurrence of contact resistances at the surface of the semiconductor and the electrode; the ohmic character of the contact electrode is wholly or partly lost.

Applicants have found a method of manufacturing an electric circuit element having an n-type semiconductor oxidic ceramic body provided with at least one ohmic contact electrode of which in the circumstances described the electric resistance does not vary substantially and in which consequently the ohmic character of the contact electrode is maintained; also in these circumstances the electric resistance has a great stability.

Other advantages of a contact electrode provided according to the invention are inter alia: a very good adhesion to the semiconductor body; the metal of the electrode provided directly on the ceramic body does substantially not dissolve in the commonly used solder.

The invention relates to an electric circuit element having an n-type semiconductor oxidic ceramic body provided with at least one ohmic contact electrode, characterized in that the ohmic electrode formed from a chromium-containing layer of metal provided on the ceramic body by vapor deposition in vacuo, said layer consisting at least for 50% by weight of chromium and for the balance substantially of nickel or cobalt or of both metals, and from a layer consisting of a solderable metal provided on said layer by vapor deposition in vacuo.

The semiconductor body may be, for example, semiconductive titanium dioxide or alkaline earth metal titanate, for example, made semiconductive with the use of the principle of controlled valency, for example, in that a small quantity of an oxide of a rare earth metal is incorporated therein. Suitable is, for example, titanium dioxide which contains an oxide of tungsten or niobium, and particularly barium titanate which contains an oxide of lanthanum or antimony, and in particular barium strontium titanate which contains one of these oxides.

The semiconductor ceramic body may be obtained in known manner by shaping, for example compression, and sintering.

The ohmic contact electrode is provided in two layers. The layer directly provided on the ceramic body—which layer consists of metal which consists for at least 50% by weight of chromium and for the balance substantially of nickel or cobalt or of both metals is provided by vapor deposition in vacuo. This vapor deposition may be effected in known manner and be carried out, for example, as in the vapor deposition of resistance layers of nickel-chromium.

The chromium-containing metal which for that purpose is heated to a temperature, preferably above the melting point, at which a reasonably rapid evaporation takes place, may have different compositions. Suitable are, for example, commercial compositions such as Ni-chroom (80% Ni, 20% Cr) Chromel (90% Ni, 10% Cr) and Inconel (76% Ni, 15% Cr, 9% Fe). Preferably a binary alloy of chromium and nickel is used and in particular that consisting of 80% Ni and 20% Cr. As a suitable chromium-cobalt alloy may be mentioned that consisting of 80% of Co and 20% of Cr.

Other nickel-chromium alloys may also be used, for example, consisting of 60% by weight of nickel and 40% by weight of chromium, or alloys mainly consisting of nickel and chromium which also contain other alloys constituents in small quantities (not more than 10% by weight) and, for example, of an alloy of the following composition:

72% by weight of Ni,
20% by weight of Cr,
5% by weight of Fe,
1% by weight of Si,
1% by weight of Mn,
0.5% by weight of Ti, and
0.5% by weight of Cu.

It is a known fact, that on evaporating an alloy consisting of nickel and chromium, the evaporation rate of chromium is considerably larger than of nickel as a result of the considerable difference in vapor pressure of the two metals at high temperature. This phenomenon involves that in the vapor-deposited layer the content of chromium is considerably higher than in the alloy from which was started. In practice, when using said nickel-chromium alloy with 20% by weight of chromium, metal layers can be deposited which contain at least 70% by weight of chromium.

It has remarkably been found that the other alloy metal of the chromium alloy which is mainly present in the alloy from which is started, has a considerable influence on the stability of the contact electrodes when they are subjected for a prolonged period of time to a moist atmosphere at elevated temperature. The greatest stability was achieved if nickel-chromium or cobalt-chromium alloys were used as the starting material. These alloys are therefore to be preferred. Similar alloys containing small quantities, less than approximately 10% by weight, of other metals gave good results in this respect. Less favorable results were obtained with alloys consisting of iron and chromium.

For making solderable the ohmic contact electrodes according to the invention a second layer of a solderable metal must be provided on the vapor-deposited chromium-containing layer. For this second layer silver is to be preferred: nickel is also suitable.

The vapor deposition of said second layer must be effected before the body with the vapor deposited chromium-containing layer is exposed to an oxidizing atmosphere. In practice, the vapor deposition of the two layers will be carried out after each other in the same space in vacuo.

In order that the invention may readily be carried into effect, it will now be described in greater detail, by way of example, with reference to the ensuing specific examples.

In these examples, the vapor deposition of the metal layers is carried out at a pressure of approximately $10^{-5}$ mm. mercury in a vacuum bell-jar. This vacuum bell-jar contained, in addition to the semiconductive ceramic bodies (circular wafers, diameter 7.5 mms., thickness 1.85 mms.) on which the metal layers were to be deposited, a tungsten crucible containing the chromium-containing metal for example, pieces of a nickel-chromium wire, consisting of 80% by weight of Ni and 20% by weight of Cr, and a tantalum crucible containing silver.

First the tungsten crucible was (electrically) heated at a temperature above the melting point of the chromium-containing alloy, until a chromium containing layer of a sufficient thickness (0.25–1$\mu$) was provided. The duration of the vapor deposition was approximately 15 seconds. Then heating of this crucible was discontinued and the tantalum crucible was heated for vapor-depositing a second metal layer consisting of silver up to a thickness of approximately 0.5–4$\mu$. In this manner the desired metal layers were provided on the two side surfaces of each wafer. The resulting bodies were provided with supply wires by soldering said wires on to the silver layers with a normal solder consisting of 57% by weight of Sn, 36% by weight of Pb and 7% by weight of Ag.

The resulting circuit elements (ceramic electric resistors) were subjected to various life tests. A number of them were alternately exposed to a direct voltage of 30 volt at 25° C. each time for four minutes during intermediate periods of four minutes the voltage was switched off. After a large number of these cycles the electric resistance of the elements was measured.

These tests were carried out with circuit elements having semiconductor ceramic bodies of various compositions, inter alia the following:

series A: $Ba_{1.0}Ti_{1.0175}O_3$+0.15 mol percent $Sb_2O_3$, (Tables I and II).

series B: $Ba_{0.70}Sr_{0.30}Ti_{1.0175}O_3$+0.15 mol percent $Sb_2O_3$, (Table III).

The results of the tests are shown in Tables I and II for the series A and in Table III for the series B. Six samples of each composition were tested. In the tables are stated the electric resistances in ohms before the life test and after the samples had been subjected to the life test as described for 168, 336, 500 and 1000 hours, respectively. The number of cycles is also stated.

For the samples of which the results are shown in Table I, an alloy consisting of 80% by weight of nickel and 20% by weight of chromium was used for providing the chromium-containing layer; for those of Table II an alloy consisting of 80% by weight of cobalt and 20% by weight of chromium was used for that purpose.

In the tables is also stated the relative change of the electric resistance. This is expressed in percent of the original value and indicated in the table as difference.

Table III shows in the same manner the results with the samples of series B. For providing the chromium-containing layer, an alloy of 80% by weight of nickel and 20% by weight of chromium was used.

In all the cases a layer of silver was provided on the chromium-containing layer by vapor deposition in vacuo as described above.

Two series of samples manufactured as described above were also subjected to other life tests.

In these life tests (series C and D) they were subjected to moist air (relative humidity 100%) at 40° C. For series C (Tables IV and V) the ceramic bodies of the samples had the same composition as those of the series A, for series D (Table VI) the same as those of series B.

The results are indicated in the tables in the same manner as described above. The Tables IV and V relate to tests of series C. In the samples shown in Table IV an alloy consisting of 80% by weight of nickel and 20% by weight of chromium was used for providing the chromium-containing layer in the samples shown in Table V an alloy consisting of 80% by weight of cobalt and 20% by weight of chromium was used. The results of series D are recorded in Table VI. For providing the chromium-containing layer, an alloy consisting of 80% by weight of nickel and 20% by weight of chromium was used.

From the results shown in the table it may be seen that particularly the circuit elements in which for providing the chromium-containing layer of the contact electrodes an alloy was used which consists of 80% by weight of nickel and 20% by weight of chromium particularly good results were obtained in the life tests described. It has been found that the stability and the ohmic character of these electrodes is particularly good. The same was found for samples in which for providing the chromium-containing layer on the semiconductor ceramic body a nickel chromium alloy was used of a different composition which contained 10% by weight of chromium or more.

In addition it may be seen from Tables III and VI that in particular in semiconductors the ceramic body of which consists of semiconductor barium strontium titanate, very stable contact electrodes with ohmic character are obtained according to the invention.

The circuit elements according to the invention may be electric ceramic resistors having a positive temperature coefficient (PTC-resistors) the ceramic body of which consists, for example, of semiconductor barium or barium strontium titanate.

Alternatively, the circuit elements according to the invention may be electric ceramic resistors having a negative temperature coefficient (NTC-resistors) the ceramic body of which consists, for example, of semiconductor iron oxide which contains titanium dioxide of the formula $(Fe_{1-\alpha}Ti_{\alpha})_2O_3$, in which formula $\alpha$=0'1—0'3.

Circuit elements according to the invention may be, in addition voltage-dependent electric ceramic resistors in which one of the electrodes is provided with the use of the method according to the invention, while the other electrode is a barrier layer electrode which may be provided in known manner. The ceramic body in such elements may be, for example, a semiconductor barium- or barium-strontium titanate.

TABLE I

| Sample No. | Duration in hours: 0 Number of cycles: 0 | 168 difference 1,260, in percent | 336 difference 2,520, in percent | 500 difference 3,750, in percent | 1,000 difference 7,500, in percent |
|---|---|---|---|---|---|
| 1 | 68.06 | 68.49+0.63 | 68.41+0.51 | 69.07+1.48 | 69.26+1.76 |
| 2 | 73.45 | 73.58+0.17 | 73.46+0.01 | 74.34+1.21 | 74.62+1.59 |
| 3 | 66.60 | 67.23+0.94 | 68.01+0.61 | 67.79+1.78 | 68.03+2.14 |
| 4 | 66.31 | 66.73+0.63 | 66.33+0.33 | 67.29+1.47 | 67.48+1.76 |
| 5 | 66.70 | 68.13+2.14 | 67.94+1.85 | 68.66+2.93 | 68.89+3.28 |
| 6 | 69.65 | 69.84+0.27 | 69.63−0.02 | 70.22+0.81 | 70.51+1.23 |

TABLE II

| Sample No. | Duration in hours: 0 Number of cycles: 0 | 168 difference 1,260, in percent | 336 difference 2,520, in percent | 500 difference 3,750, in percent | 1,000 difference 7,500, in percent |
|---|---|---|---|---|---|
| 1 | 63.88 | 65.15+1.98 | 64.99+1.73 | 65.69+2.83 | 66.16+3.56 |
| 2 | 78.32 | 79.84+1.94 | 79.63+1.67 | 80.41+2.66 | 81.02+3.44 |
| 3 | 82.74 | 83.37+0.76 | 83.16+0.50 | 83.90+1.47 | 84.71+2.38 |
| 4 | 57.43 | 58.09+1.14 | 58.09+1.14 | 58.53+1.91 | 58.94+2.62 |
| 5 | 68.40 | 70.03+2.38 | 69.88+2.16 | 70.44+2.98 | 70.97+3.75 |
| 6 | 82.73 | 85.36+3.17 | 85.20+2.98 | 86.02+3.97 | 86.62+4.70 |

TABLE III

| Sample No. | Duration in hours: 0 Number of cycles: 0 | 168 difference 1,260, in percent | 336 difference 2,520, in percent | 500 difference 3,750, in percent | 1,000 difference 7,500, in percent |
|---|---|---|---|---|---|
| 1 | 45.5 | 45.3−0.43 | 45.1−1.09 | 45.2−0.65 | 45.5−0.21 |
| 2 | 57.4 | 45.8−0.96 | 56.6−1.68 | 46.6−1.68 | 37.5+0.21 |
| 3 | 45.6 | 45.4−0.43 | 45.6 0.0 | 45 −1.31 | 45.4−0.43 |
| 4 | 48.7 | 48.9+0.41 | 49.9+2.46 | 49.1+0.82 | 49 +0.61 |
| 5 | 49.9 | 50.3+0.80 | 50.5+1.20 | 50.3+0.80 | 50.4+1.00 |
| 6 | 53.9 | 54 +0.18 | 53.6−0.55 | 53.4+0.92 | 54.1+0.37 |

TABLE IV

| Sample No. | Duration in hours: 0 | 168 difference in percent | 336 difference in percent | 500 difference in percent | 1,000 difference in percent |
|---|---|---|---|---|---|
| 1 | 68.16 | 68.97+1.18 | 69.03+1.27 | 69.27+1.62 | 69.56 2.05 |
| 2 | 72.83 | 73.60+1.05 | 73.65+1.12 | 73.91+1.48 | 74.21+1.89 |
| 3 | 64.92 | 65.92+1.54 | 65.62+1.07 | 65.77+1.30 | 66.05+1.75 |
| 4 | 58.05 | 58.65+1.03 | 58.73+1.17 | 58.97+1.58 | 59.24+2.04 |
| 5 | 74.62 | 75.41+1.05 | 75.53+1.21 | 75.77+1.54 | 76.12+2.01 |
| 6 | 70.10 | 70.88+1.11 | 70.92+1.16 | 71.04+1.34 | 71.41+1.86 |

TABLE V

| Sample No. | Duration in hours: 0 | 168 difference in percent | 336 difference in percent | 500 difference in percent | 1,000 difference in percent |
|---|---|---|---|---|---|
| 1 | 73.78 | 74.79+1.36 | 74.81+1.39 | 74.96+1.59 | 75.32+2.08 |
| 2 | 63.98 | 64.75+1.20 | 64.77+1.23 | 64.97+1.54 | 65.27+2.01 |
| 3 | 62.84 | 63.47+1.16 | 63.75+1.44 | 63.89+1.67 | 64.25+2.24 |
| 4 | 68.96 | 69.84+1.27 | 69.94+1.42 | 70.12+1.68 | 70.42+2.11 |
| 5 | 87.44 | 88.59+1.31 | 88.66+1.39 | 89.06+1.85 | 89.41+2.25 |
| 6 | 66.85 | 67.61+1.13 | 67.74+1.33 | 67.89+1.55 | 68.24+2.07 |

TABLE VI

| Sample No. | Duration in hours: 0 | 168 difference in percent | 336 difference in percent | 500 difference in percent | 1,000 difference in percent |
|---|---|---|---|---|---|
| 1 | 73.45 | 73.58+0.17 | 73.46+0.01 | 74.34+1.21 | 74.62+1.59 |
| 2 | 66.31 | 66.73+0.63 | 66.53+0.33 | 67.29+1.47 | 67.48+1.76 |
| 3 | 69.65 | 69.84+0.27 | 69.23−0.02 | 70.22+0.81 | 70.51+1.23 |
| 4 | 64.92 | 65.92+1.54 | 65.62+1.07 | 65.77+1.30 | 66.06+1.75 |
| 5 | 70.10 | 70.88+1.11 | 70.92+1.16 | 71.04+1.34 | 71.41+1.86 |
| 6 | 87.44 | 88.59+1.31 | 88.66+1.39 | 89.06+1.85 | 89.06+1.85 |

What is claimed is:

1. An electrical circuit element comprising an n-type semiconductor oxide ceramic body provided with an ohmic contact electrode, said electrode comprising a chromium containing layer in contact with and on a surface of said oxide ceramic body and a layer of a solderable metal in contact with and on a surface of said chromium containing layer, said chromium containing layer consisting of at least 50% by weight of chromium and the remainder essentially of a metal selected from the group consisting of cobalt and nickel and mixtures thereof.

2. The circuit element of claim 1 wherein the ceramic body is selected from the group consisting of n-type semiconductor barium titanate and n-type semiconductor barium strontium titanate.

3. The circuit element of claim 2 wherein the layer of solderable metal consists of silver.

References Cited

UNITED STATES PATENTS

| | | | |
|---|---|---|---|
| 2,799,600 | 7/1957 | Scott | 117—211 |
| 2,962,393 | 11/1960 | Ruckelshaus | 117—212 |
| 2,973,466 | 2/1961 | Atalla et al. | 317—234 M |
| 3,241,931 | 3/1966 | Triggs et al. | 317—234 M |
| 3,252,722 | 5/1966 | Allen | 117—217 |
| 3,270,256 | 8/1966 | Mills et al. | 317—234 M |
| 3,307,079 | 2/1967 | Eisenhower, Jr. et al. | 317—234 M |
| 3,380,155 | 4/1966 | Burks | 317—234 M |
| 3,428,474 | 2/1969 | Hensler et al. | 117—217 |
| 3,436,614 | 4/1969 | Nagatsu et al. | 117—217 |

CAMERON K. WEIFFENBACH, Primary Examiner

U.S. Cl. X.R.

317—234 R, 234 M